UNITED STATES PATENT OFFICE.

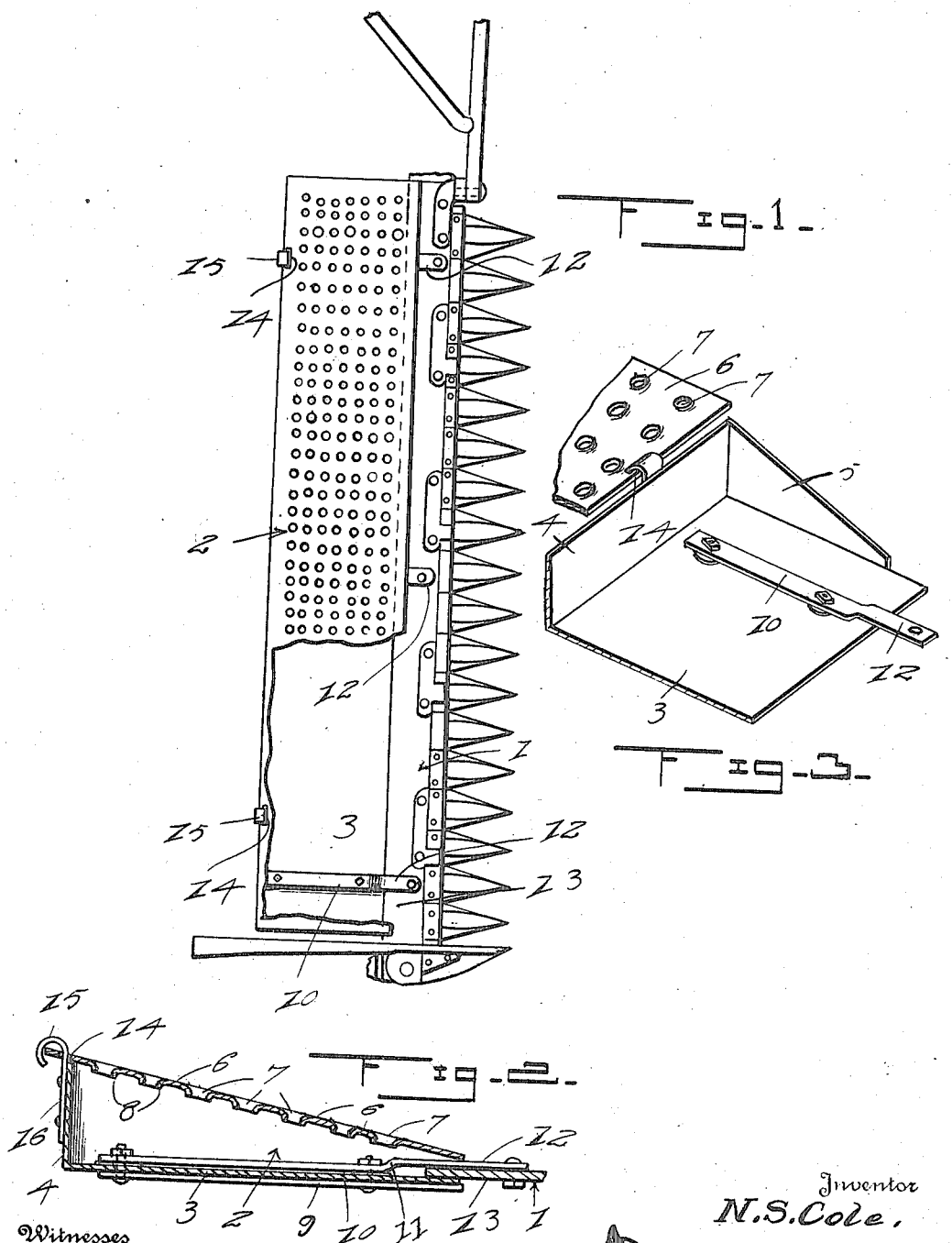

NOEL S. COLE, OF NEWBERN, TENNESSEE.

SEED-SAVING ATTACHMENT FOR MOWERS.

1,233,984.  Specification of Letters Patent.  Patented July 17, 1917.

Application filed April 28, 1917. Serial No. 165,156.

*To all whom it may concern:*

Be it known that I, NOEL S. COLE, a citizen of the United States, residing at Newbern, in the county of Dyer and State of Tennessee, have invented certain new and useful Improvements in Seed-Saving Attachments for Mowers; and I do hereby declare the following to be a full, clear, and exact description of the invention, such as will enable others skilled in the art to which it appertains to make and use the same.

This invention relates to an attachment for mowing machines which is particularly designed for saving the seed of clover, lespedeza, or analogous agricultural products, which seed is shattered from the heads during the cutting of the hay or forage.

An object of this invention is to provide a container which is detachably connected to the cutter bar structure of a mowing machine and includes a retaining body having a perforated cover hingedly connected thereto, the upper surface of which cover is smooth so as to allow the hay or forage to pass freely thereover, and which perforations are provided for permitting the seed shattered from the heads of the hay to fall therethrough into the retaining receptacle, from which they may be removed when desired.

Another object of this invention is to provide an attachment as specified which will not interfere with the operation of the cutter bar of the mowing machine, and will not hinder the cutter bar from being swung into a vertical inoperative position.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a plan view of a mowing machine cutter bar showing the invention applied thereto and having a fragment of the cover broken away.

Fig. 2 is a section through the seed saving attachment, and

Fig. 3 is a fragmentary perspective view of the attachment having the cover opened.

Referring more particularly to the drawings, 1 designates the cutter bar of an ordinary mowing machine and the seed saving attachment is generically indicated by the numeral 2. The seed saving attachment 2 comprises a receptacle having a horizontal bottom 3, an upstanding rear wall 4 and end walls 5 which are substantially triangularly shaped, so that the cover 6 of the seed saving attachment will extend upwardly at an incline and rearwardly from the cutter bar 1. The cover 6 is provided with a plurality of perforations 7 formed therein, and the portions of the cover surrounding the openings are preferably curved inwardly as shown at 8 in Fig. 2 of the drawings, so as to properly guide seed which may be shaken from the heads of the hay downwardly through the openings into the interior of the body or retaining receptacle of the seed saver.

The bottom 3 has a plurality of reinforcing braces or runners 9 attached to the under surface thereof which extend a short distance forwardly of the forward edge of the bottom and which are preferably placed directly beneath the attaching bars 10 which are secured to the upper inner surface of the bottom 3. The attaching bars 10 are bent upwardly at 11 so as to position their forward ends 12 above and in spaced relation to the upper surface of the bottom 3 so that the forward ends of these bars may be attached to the cutter bar structure 1 and allow a portion of the main body bar indicated at 13, of the cutter bar to rest upon the upper surface of the bottom 3 as clearly shown in Fig. 2 of the drawings. The cover 6 is provided with a pair of slots 14 formed therein near its rear edge through which slots the upper curved ends 15 of the bar 16 extend. The upper curved ends 15 of the bar 16 are provided for permitting the cover 6 to be swung rearwardly as shown in Fig. 3 of the drawings for permitting the seed to be removed from the receptacle.

The openings 7 are of such size as to prevent small particles of hay, chaff or the like from falling therethrough into the seed saving receptacle. The seed saver 2 is constructed so that it will be comparatively light in weight and will not interfere with the ordinary operation of the cutter bar 1, allowing the cutter bar to be swung into a vertical inoperative position, without necessitating the removal of the seed saver.

In reducing the invention to practice, certain minor features of construction, combination and arrangement of parts may necessitate alterations to which the patentee is entitled provided such alterations are comprehended within the scope of what is claimed.

What is claimed is:

1. A seed saving attachment for mowing machines comprising a receptacle having a bottom, a plurality of bars attached to the upper surface of said bottom and having their forward ends bent upwardly for lying in spaced relation to the bottom and adapted for detachable connection to a mowing machine cutter bar, a perforated cover mounted upon the receptacle and inclining upwardly and rearwardly from the cutter bar, the lower forward edge of said cover being positioned in close proximity to the upper surface of said cutter bar, said cover being hingedly connected to said receptacle and having the portions surrounding the perforations therein curved downwardly.

2. A seed saving attachment for mowing machines comprising a receptacle having a bottom, a plurality of bars attached to the upper surface of said bottom and having their forward ends bent upwardly for lying in spaced relation to the bottom and adapted for detachable connection to a mowing machine cutter bar, a perforated cover mounted upon the receptacle and inclining upwardly and rearwardly from the cutter bar, the lower forward edge of said cover being positioned in close proximity to the upper surface of said cutter bar, said cover being hingedly connected to said receptacle and having the portions surrounding the perforations therein curved downwardly, and reinforcing metallic strips attached to the bottom of said receptacle directly beneath said first named attaching strips.

In testimony whereof I affix my signature in presence of two witnesses.

NOEL S. COLE.

Witnesses:
W. M. MERWIN,
L. H. LASLEY.

Copies of this patent may be obtained for five cents each, by addressing the "Commissioner of Patents, Washington, D. C."